No. 851,585. PATENTED APR. 23, 1907.
C. BURNETT.
RESILIENT TIRE FOR MOTOR CAR AND SIMILAR WHEELS.
APPLICATION FILED FEB. 12, 1906.
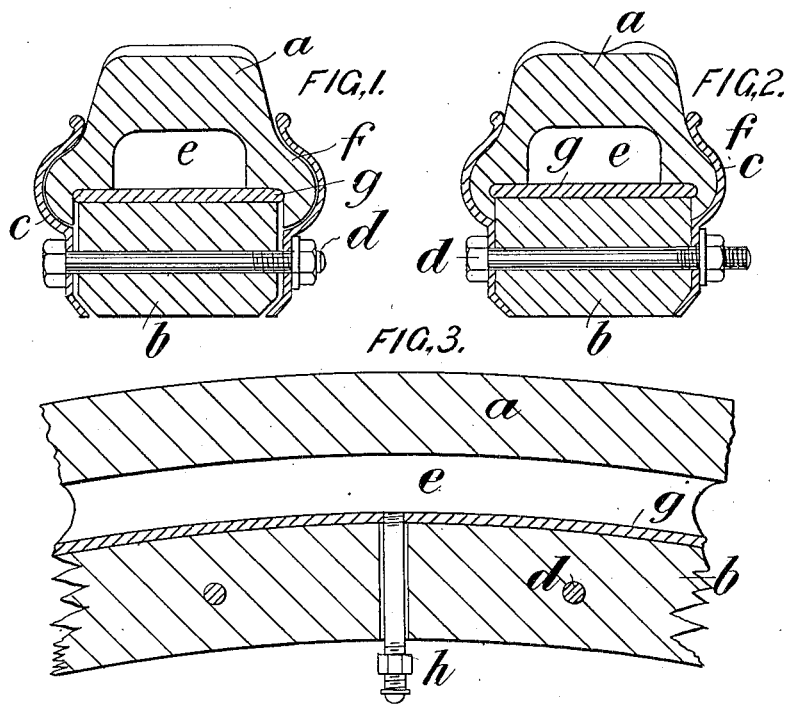

No. 851,585. PATENTED APR. 23, 1907.
C. BURNETT.
RESILIENT TIRE FOR MOTOR CAR AND SIMILAR WHEELS.
APPLICATION FILED FEB. 12, 1906.
2 SHEETS—SHEET 2.
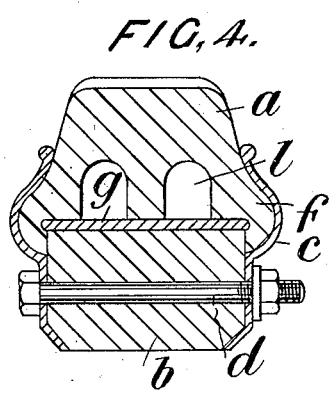
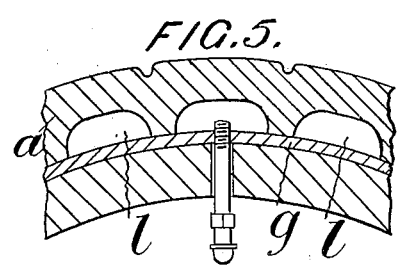
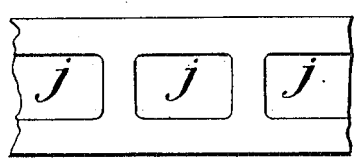
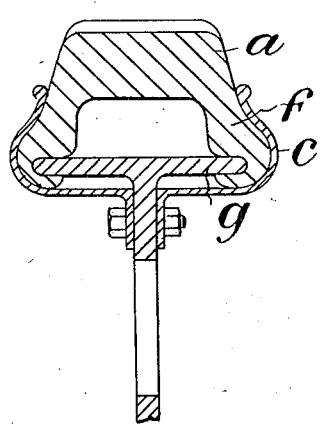
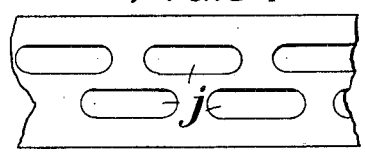
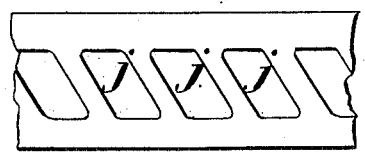
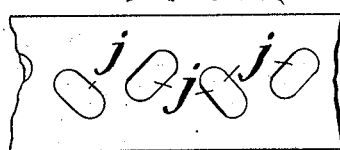

UNITED STATES PATENT OFFICE.

CUTHBERT BURNETT, OF DURHAM, ENGLAND

RESILIENT TIRE FOR MOTOR-CAR AND SIMILAR WHEELS.

No. 851,585.  Specification of Letters Patent.  Patented April 23, 1907.

Application filed February 12, 1906. Serial No. 300,662.

*To all whom it may concern:*

Be it known that I, CUTHBERT BURNETT, a subject of the King of Great Britain and Ireland, residing at Belmont House, Durham, England, have invented a new and useful Resilient Tire for Motor-Car and Similar Wheels, of which the following is a specification.

The object of this invention is to produce a tire offering a suitable amount of resiliency, greater security against puncturing, and simplicity of construction and mode of application.

The invention consists essentially in a rubber tire with a flat or nearly flat or other known suitable tread face, a chambered out inner part, and a flange or extension on each side, these flanges being applied against the rounded edges of a steel or other metal hoop or flange on the felly or wheel rim, a lashing ring being provided on each side, and bolts with nuts for forcing the tire flanges against the edges of the hoop or flange on the felly or wheel rim and so make air tight joints. The interior or chambered part of this tire thus forms a tube which can be supplied with compressed air in the usual way through a valve and a tube passed through the felly or wheel rim.

I shall now describe several typical forms of this tire.

Figure 1 is a cross section of one form of tire in the act of being applied to a wheel, Fig. 2 a cross section when fixed and Fig. 3 a sectional elevation of part of same. Fig. 4 is a cross section similar to Fig. 1 but formed with cells on the inside and Fig. 5 a sectional side elevation. Fig. 6 is a cross section of one form of tire applied to a metallic wheel. Figs. 7, 8, 9, and 10 show different forms of cells.

In Figs. 1, 2 and 3, the rubber tire $a$ is made with an inner part or space $e$ and flange extensions $f f$ which are applied against the rounded edges of a steel or other metal hoop $g$ on the felly $b$ of the wheel. $c c$ are lashing rings which by means of the bolts $d$ and nuts or equivalent means force the tire flange extensions $f$ against the rounded edges of the hoop $g$ so making air-tight joints. The space $e$ or tube thus formed can be supplied with compressed air in the usual way through a valve and a tube $h$.

Fig. 4 shows a tire with a double row of cells $i$ and Fig. 5 a sectional elevation of same to a smaller scale.

Fig. 6 shows the tire in one form as applied to a metallic wheel which is formed with flanges $g$.

In some of the forms of tire an inner usual inflatable tube may be applied.

The cells formed on the under side of the tires may, as indicated by $j$ be of the form shown in Fig. 7 viz: in one row, or in one row but slanting as in Fig. 8, or in two parallel but staggered rows as in Fig. 9 or in two oppositely slanting rows as in Fig. 10. These cells form efficient air cushions even without inflation by compressed air, or in case of a puncture all the cells except the punctured one will form air cushions. In the case of the arrangement, Figs. 9 and 10, if one cell should be punctured, the cells in the adjoining row will to a great extent support the punctured cell, as the air in the cells will form cushions under compression that is to say when coming on the tread.

When a cellular tire is being inflated the divisions between the cells will, one after the other as the inflating pressure is increased, be lifted from the metal hoop $g$ and allow the compressed air to fill them all.

What I claim as my invention, and desire to secure by Letters Patent, is—

1. The combination of a wheel, a metallic rim thereon having rounded edges, a rubber tire chambered on the inner side and provided with lateral flange extensions, which rest on the outer face of the rim and against the rounded edges of the same, annular lash plates on the outer chambered part of the tire and the lateral flange extensions, bolts passing through the wheel and through the lash plates and provided with nuts for making airtight joints between the rim edges and the tire, and means for supplying compressed air to the interior of the tire, substantially as set forth.

2. The combination of a wheel, a metallic rim thereon with rounded edges, a rubber tire with cellular chambers on the inner side and provided with lateral flange extensions, which rest on the outer face of the rim and against the rounded edges of the same, annular lash plates on the outer chambered part of the tire and the lateral flange extensions, bolts passing through the wheel and through the lash plates and provided with nuts for making airtight joints between the rim edges and the tire and means for supplying compressed air to the interior of the tire, substantially as set forth.

In testimony whereof I have signed my name to this specification in the presence of two subscribing witnesses.

CUTHBERT BURNETT.

Witnesses:
ARTHUR COWEN ALDER,
H. NIXON.